(12) United States Patent
Gault et al.

(10) Patent No.: US 7,280,900 B2
(45) Date of Patent: Oct. 9, 2007

(54) TECHNICAL VIRTUAL ADVISOR

(75) Inventors: Thomas A. Gault, Clawson, MI (US); Bruce A. Groskreutz, Grand Blanc, MI (US); Daniele Nicolini, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 198 days.

(21) Appl. No.: 10/784,361

(22) Filed: Feb. 23, 2004

(65) Prior Publication Data

US 2005/0187682 A1    Aug. 25, 2005

(51) Int. Cl.
*G06F 19/00*    (2006.01)

(52) U.S. Cl. .......................... 701/33; 701/29; 701/32; 455/415; 455/419; 455/420

(58) Field of Classification Search .................. 701/29, 701/32, 33, 1, 31; 455/419, 420
See application file for complete search history.

(56) References Cited

U.S. PATENT DOCUMENTS

| | | | |
|---|---|---|---|
| 6,127,947 A | * | 10/2000 | Uchida et al. .............. 340/999 |
| 6,128,376 A | * | 10/2000 | Smith .................... 379/201.01 |
| 6,181,994 B1 | * | 1/2001 | Colson et al. ................. 701/33 |
| 6,757,262 B1 | * | 6/2004 | Weisshaar et al. .......... 370/310 |
| 2002/0065590 A1 | * | 5/2002 | Matsui ......................... 701/33 |
| 2004/0203692 A1 | * | 10/2004 | Schwinke et al. .......... 455/419 |
| 2005/0090941 A1 | * | 4/2005 | Stefan et al. .................. 701/1 |
| 2005/0107928 A1 | * | 5/2005 | Mueller ....................... 701/33 |

* cited by examiner

*Primary Examiner*—Thomas Black
*Assistant Examiner*—Marie A Weiskopf

(57) ABSTRACT

A system and method for managing technical services within a mobile vehicle communications system. The method describes receiving a request for technical services from a telematics device, determining a technical service action based on the received request for technical services, and providing a technical service to the telematics device responsive to the technical service action determination. A computer readable medium is described that includes computer readable code for controlling a communication interface implemented to receive a request for technical services from a telematics device, computer readable code for determining a technical service action based on the received request for technical services, and computer readable code for providing a technical service to the telematics device responsive to the technical service action determination.

14 Claims, 3 Drawing Sheets

TECHNICAL VIRTUAL ADVISOR

FIELD OF THE INVENTION

The invention relates to vehicles, and more particularly to methods and systems for managing technical services within a mobile vehicle communications system.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system allows for a variety of fee-based subscription services to be provided in a mobile environment. The VCU is typically a vehicle telematics device including a cellular radio, satellite transceiver and a global positioning system (GPS). Communication through a carrier service may be initiated at the VCU at turn-on or through manual or voice command phone number entry. Typically, a radio communication link is established between the VCU and a Wide Area Network (WAN), using a node of the WAN in the vicinity of the VCU. In addition to enabling telecommunication services, a telematics device may be configured to perform various processing functions and to exchange various types of data through a service provider.

In order to provide telematics services to a customer, various software updates, reconfigurations, and other forms of technical services may be required at the customer's telematics device. One solution for providing such services involves automated technical services download to the teleinatics device from the service center. However, when a service provider is unable to provide the technical services to a telematics device due to an intervening cause, such as when the telematics device is operating defectively, the vehicle must be brought to a service facility such as a dealership for technical services and maintenance. A service provider typically offers various services to a subscriber including the assistance of a live advisor. If a customer is aware of a telematics malfunction or desires some form of technical services, an advisor at a service center may be able to provide assistance. However, many types of technical services require the upload of data to a telematics device, and in some cases diagnostic functions as well. In order to provide such services to a client, an advisor may be required to transfer a customer to a technically trained customer service agent or department in order to diagnose problems or implement technical services. Transfer of customers to other advisors and departments is undesirable due to inherent organizational inefficiencies and potential customer dissatisfaction.

It would be desirable therefore, to provide a method and system for managing technical services within a mobile vehicle communications system that overcomes these and other disadvantages.

SUMMARY OF THE INVENTION

The present invention is directed to a method of managing technical services within a mobile vehicle communications system that includes receiving a request for technical services from a telematics device, determining a technical service action based on the received request for technical services, and providing a technical service to the telematics device responsive to the technical service action determination.

In accordance with yet another aspect of the invention, a computer readable medium includes computer readable code for controlling a communication interface implemented to receive a request for technical services from a telematics device, computer readable code for determining a technical service action based on the received request for technical services, and computer readable code for providing a technical service to the telematics device responsive to the technical service action determination.

In accordance with still another aspect of the invention, a system for managing technical services within a mobile vehicle communications system includes means for receiving a request for technical services from a telematics device, means for determining a technical service action based on the received request for technical services, and means for providing a technical service to the telematics device responsive to the technical service action determination.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
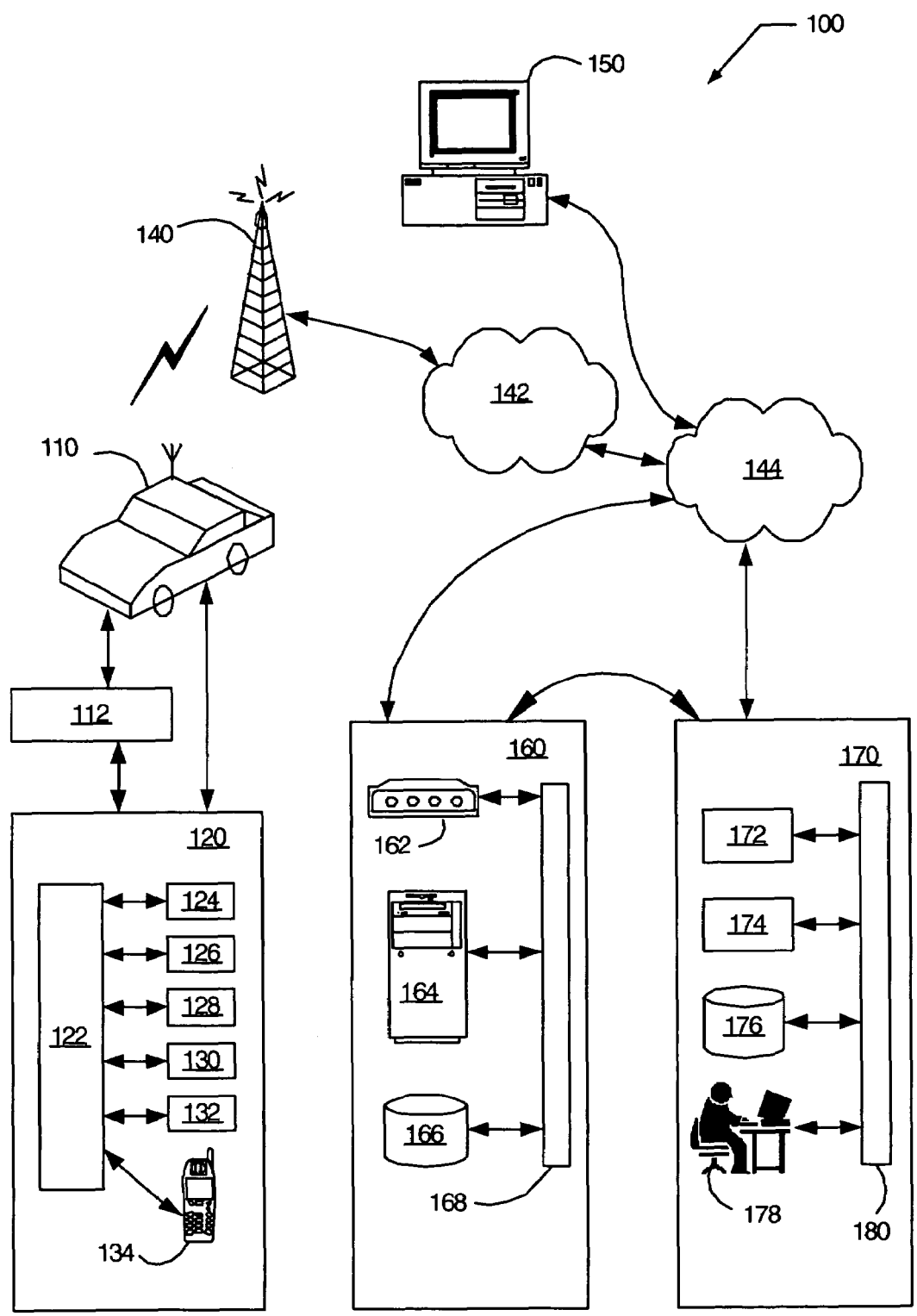
FIG. 1 is an illustrative operating environment for managing technical services within a mobile vehicle communications system in an embodiment of the present invention.

FIG. 1 is an illustrative operating environment for managing technical services within a mobile vehicle communications system in an embodiment of the present invention. FIG. 1 shows a mobile vehicle communication system 100. Mobile communication system 100 includes at least one mobile vehicle 110 (vehicle) including vehicle communication bus 112 and vehicle communications unit (VCU) 120, one or more wireless carrier systems 140, one or more communication networks 142, one or more land networks 144, one or more client, personal or user computers 150, one or more web-hosting portals 160, and one or more call centers 170. In one embodiment, mobile vehicle 110 is implemented as a vehicle equipped with suitable hardware and software for transmitting and receiving voice and data communications.

In one embodiment, vehicle communications unit 120 is a telematics device that includes a digital signal processor (DSP) 122 connected to a wireless modem 124, a global positioning system (GPS) unit 126, an in-vehicle memory 128, such as, for example, a non-volatile flash memory, a microphone 130, one or more speakers 132, and an embedded or in-vehicle mobile phone 134. In one embodiment, DSP 122 is a microcontroller, controller, host processor, or vehicle communications processor. In an example, DSP 122 is implemented as an application specific integrated circuit (ASIC). GPS unit 126 provides longitude and latitude coordinates of the vehicle. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

DSP 122 executes various computer programs and communication control and protocol algorithms that affect communication, programming and operational modes of electronic and mechanical systems within vehicle 110. In one embodiment, DSP 122 is an embedded system controller. In another embodiment, DSP 122 affects communications between telematics device 120, wireless carrier system 140, and call center 170. In another embodiment, DSP 122 provides the functionality of a human speech recognition system (ASR) module. In still another embodiment, DSP 122 provides data processing, analysis and control functions to facilitate technical services management. DSP 122 is configured to generate and receive digital signals transmitted between telematics device 120 and a vehicle communication bus 112 that is connected to various electronic modules in the vehicle 110. In one embodiment, the digital signals activate a programming mode and various operational modes, as well as facilitate data transfers. In another embodiment, a program facilitates the transfer of service data such as instructions, triggers and data requests between vehicle 110 and a call center 170.

Mobile vehicle 110, via a vehicle communication bus 112, sends signals to various units of equipment and systems within vehicle 110 to perform various functions such as monitoring the operational state of vehicle systems, collecting and storing data from the vehicle systems, providing instructions, data and programs to various vehicle systems and outpulsing (dialing) calls from telematics device 120. In facilitating interactions among the various communication and electronic modules, vehicle communication bus 112 utilizes bus interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication bus 112 is a direct connection between connected devices.

Vehicle 110, via telematics device 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems. In another embodiment, a cellular System Identifier (SID) table at telematics device 120 identifies a preferred carrier system 140. In an example, a telematics device 120 initiating a communication through communication network 142 selects a preferred carrier or a secondary carrier based on an SID table and prevailing network traffic and other considerations. In one embodiment, a preferred or secondary carrier identified in an SID table is configured with a home location register (HLR). In another embodiment, a visitor location register VLR connects two HLRs for operation, as is understood in the art. In yet another embodiment, a so-called "side-switch carrier change" is enabled to change from one carrier to another between calls as will be known to the skilled practitioner. In an embodiment, a carrier having a home location register enables authenticated call connections with a "handshake" exchange of telematics device and service center identification data after the authentication.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, a virtual private network (VPN) or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160 and vehicle 110. Personal or user computer 150 sends data to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within vehicle 110, or telematics device 120. In another embodiment, the data includes requests for certain data such as telematics device 120 diagnostic data. In operation, a user, such as, for example, a vehicle designer or manufacturing engineer, utilizes user computer 150 to exchange data with mobile vehicle 110 that is cached or stored in web-hosting portal 160. In an embodiment, mobile vehicle data from client-side software is transmitted to server-side software of web-hosting portal 160. In another embodiment, user account, vehicle, and telematics device identification data is stored at web-hosting portal 160. In another embodiment, client computer 150 includes a database (not shown) for storing received identification data and technical services action request data. In yet another embodiment, a private Local Area Network (LAN) is implemented for client computer 150 and Web hosting portal 160, such that web hosting portal is operated as a Virtual Private Network (VPN).

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data, requests or instructions from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics device 120 in vehicle 110. Web server 164 sends to or receives data transmissions from one or more databases 166 via network 168. In an embodiment, web server 164 includes computer applications and files for managing emission performance data.

In one embodiment, one or more web servers 164 are networked via network 168 to distribute vehicle identification and technical services action request data among its network components such as database 166. In an example, database 166 is a part of or a separate computer from web server 164. In one embodiment, web-server 164 sends data transmissions including emission performance data to call center 170 via modem 162, and through land network 144.

Call center 170 is a location where many calls are received and serviced at the same time and where many calls are sent from at the same time. In one embodiment, the call center is a telematics call center, facilitating communications to and from telematics device 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 includes one or more communication interfaces 172, such as voice and data modems and switches, one or more communication services managers 174, one or more communication services databases 176, one or more communication services advisors 178, and one or more networks 180.

Communication interface 172 of call center 170 connects to land network 144. Communication interface 172 transmits voice or data transmissions from call center 170, and receives voice or data transmissions from telematics device 120 in mobile vehicle 110 through wireless carrier system 140 and/or wireless modem 124, communication network 142, and land network 144. Communication interface 172 receives data transmissions from, and sends data transmissions to, one or more web-hosting portals 160 and telematics devices 120. Communication interface 172 receives data transmissions from, or sends data transmissions to, one or more communication services managers 174 via one or more networks 180.

Communication services manager 174 is any suitable hardware and software capable of providing communication services to telematics device 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends to communication interface 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and retrieval of vehicle telematics device data. In an embodiment, communication services manager 174 receives technical services data from a user via user computer 150, web-hosting portal 160, and land network 144. Communication services manager 174 transmits and receives operational status, instructions and other types of vehicle data to telematics device 120 in mobile vehicle 110 through wireless carrier system 140, communication network 142, land network 144, wireless modem 124, communication interface 172, and network 180. Communication services manager 174 stores or retrieves technical service data to and from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics device 120. In another example, a virtual advisor or technical virtual advisor is implemented as a synthesized voice interface responding to requests from telematics device 120 in mobile vehicle 110. In another embodiment, communication services advisor 178 is embodied in software executing on a computing system that provides automated technical service functions, such as for managing technical services.

Communication services advisor 178 provides services to telematics device 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics device 120 in mobile vehicle 110 through wireless carrier system 140, communication network 142, and land network 144 using voice transmissions, or through communication services manager 174 and communication interface 172 using data transmissions. Communication interface 172 selects between voice transmissions and data transmissions.

Mobile vehicle 110 initiates technical service requests to call center 170 by sending a voice or digital-signal command to telematics device 120 which in turn, sends an instructional signal, device identification signal or a voice call through wireless modem 124, wireless carrier system 140, communication network 142, and land network 144 to call center 170. In another embodiment, the technical service request is for a data upload that initiates a data transfer between vehicle 110 and service center 170 or web hosting portal 160 to implement a technical service. A technical service is, for example, a process that provides SID table updates, telematics device reconfigurations, mobile configurations, programming error corrections, and phone number configurations for one or more telematics devices 120.

In another embodiment, the mobile vehicle 110 receives a request from call center 170 to send various telematics device 120 data from mobile vehicle 110 through telematics device 120 through wireless modem 124, wireless carrier system 140, communication network 142, and land network 144 to call center 170. In one embodiment, a user initiates a service request by activating a tactile or voice-operated user interface.

Figure 2:
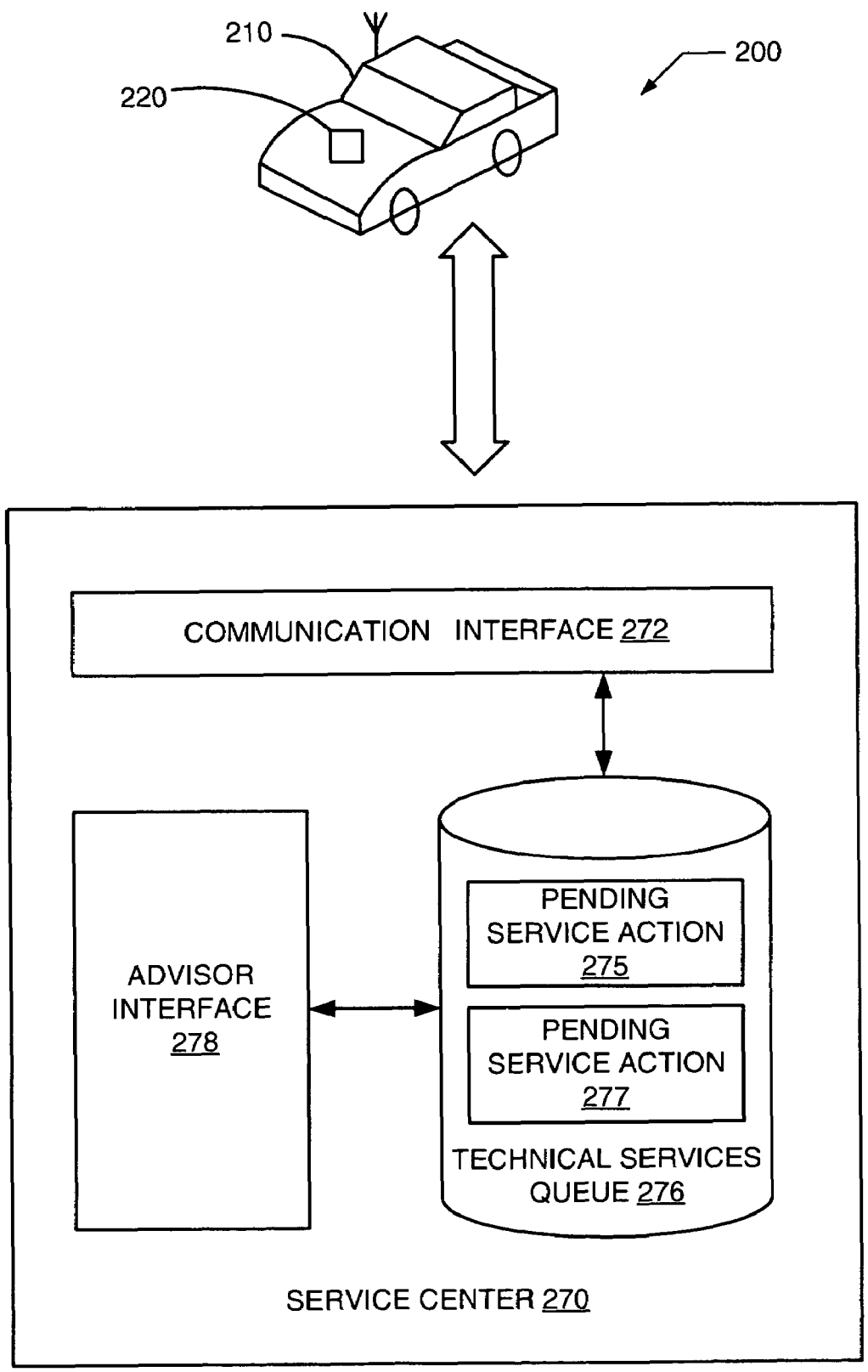
FIG. 2 is a block diagram of a system for managing technical services within a mobile vehicle communications system in accordance with an embodiment of the present invention.

FIG. 2 is a block diagram of a system for managing technical services within a mobile vehicle communications system in accordance with an embodiment of the present invention. FIG. 2 shows a technical services management system 200. In one embodiment, the components of technical services management system 200 are operational within the illustrative operating environment of FIG. 1.

In FIG. 2, the technical services management system 200 (management system) includes a telematics service center 270, and a mobile vehicle 210 incorporating a telematics device 220. The service center 270 is shown including a technical services queue 276 containing pending service actions 275 and 277, a communication interface 272 and an advisor interface 278. The telematics service center 270 is shown having a bidirectional communication link with vehicle 210.

Mobile vehicle 210 is any type of vehicle including a passenger vehicle, bus, truck and the like. In one embodiment, vehicle 210 and various systems of vehicle 210, are uniquely identifiable via an assigned identification code such as, for example, a vehicle identification number (VIN) or a device identification code, such as an electronic serial number (ESN) of a vehicle system or telematics device 220.

Telematics device 220 is any telematics device enabled for operation with a telematics service provider such as telematics device 120 as described with reference to FIG. 1. Telematics device 220 includes volatile and non-volatile memory components for storing data and programs. In one embodiment, memory components in telematics device 220 include one or more programs (not shown) for performing communication and authentication functions, and managing technical services, processes and data transfers. In an embodiment, analytic processes performed by telematics device 220 include determining telematics device failure codes, and the like. In another embodiment, a data upload module manages technical services information such as SID table data, configuration data and commands and programs. In still another embodiment, the telematics device 220 acts as a data cache for received data, prior to performing a technical serviced action on the telematics device 220.

Telematics service center 270 is any service center providing telematics services such as call center 170 described with reference to FIG. 1. In one embodiment, service center 270 includes hardware and software for managing one or more databases with at least one database configured as technical services queue 276. In another embodiment, service center 270 is configured to access a database that is in another location but coupled to service center 270 such as, for example, database 166 in web server 160 as described in FIG. 1. In an embodiment, technical services queue 276 contains pending technical service actions 275, 277. In another embodiment, technical services queue 276 includes one or more programs (not shown) for managing technical services. In yet another embodiment, technical services queue 276 is a relational database that also includes information such as, for example, vehicle makes and models, individual vehicle identification numbers (VIN) and other vehicle and telematics device identifiers, and pending technical service action data 275, 277 corresponding to the specific vehicles identified in the database. In an embodiment, technical services such as dynamic configuration data or instructions are provided from service center 270 to vehicle 210. Dynamic configuration data includes instructions and data to implement technical services to reconfigure or reprogram a telematics device and the like.

Advisor interface 278 is any interface that facilitates communications between a live advisor and various computing and communications hardware of server computer of technical services management system 200. In one embodiment, the advisor interface is a personal computer such as client, personal or user computer 150 of FIG. 1.

In operation, service center 270 manages technical services data in a telematics service provider network such as the operating environment described in FIG. 1. In an embodiment, service center 270 is enabled to maintain, and otherwise manage, an automated technical services regime for a plurality of vehicles 210. In operation, service center 270 receives a selection of a technical service action 275 for a telematics device. The service action 275 is associated with a user account and a vehicle identification number for the user account and then assigned to a position in a technical services queuing database. A notification of a pending technical service action is then generated to alert a user to request the pending technical service. In operation, service center 270 receives a request for technical services from vehicle 210 and provides technical services data to vehicle 210 based on the identity of the requesting vehicle 210 and any pending technical service action in technical services queue 276. Once a user is made aware of a pending technical service, the user initiates the technical service action request through a user interface that initiates an authenticated communication from vehicle 210 to service center 270.

Figure 3:
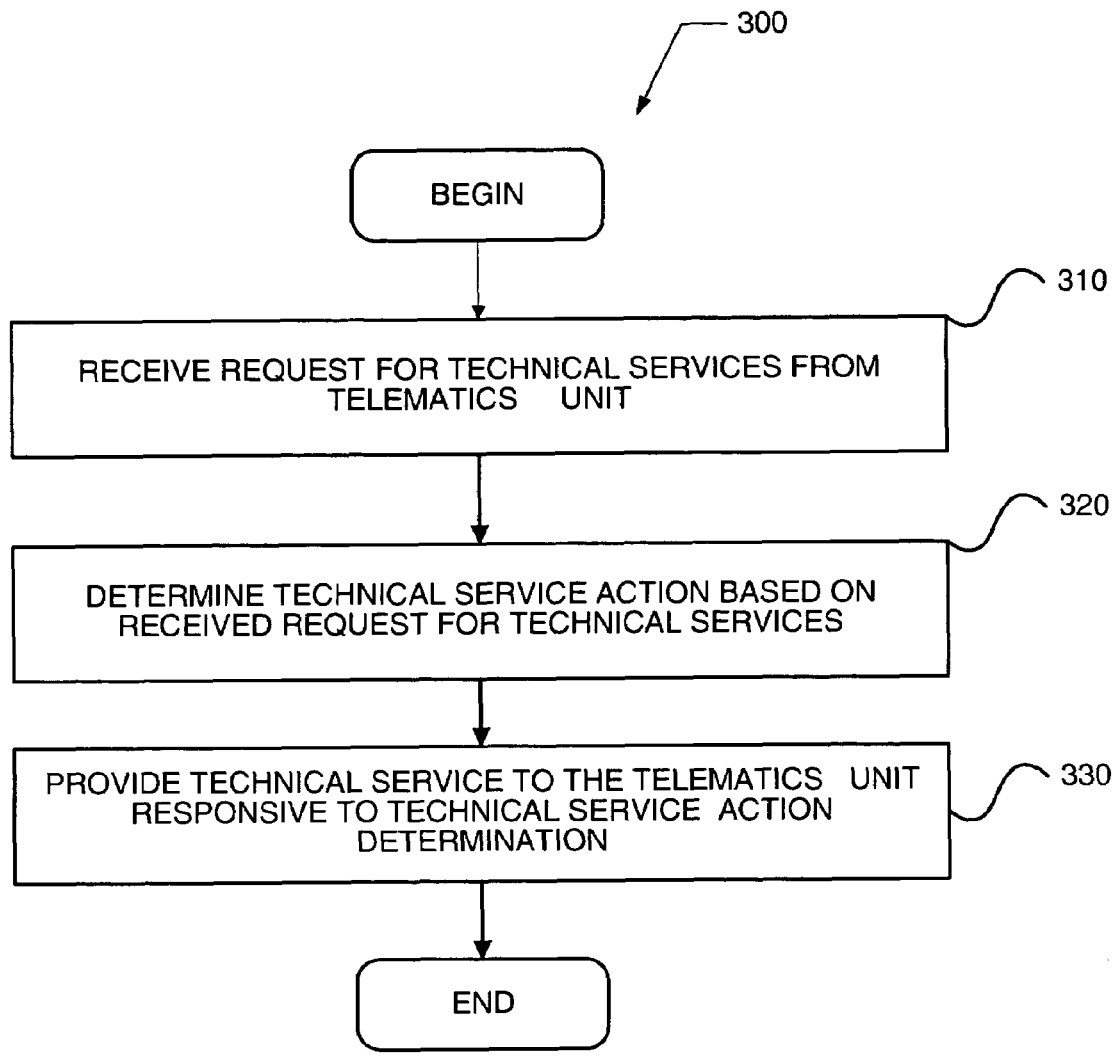
FIG. 3 is a process flow diagram illustrating a method for managing technical services within a mobile vehicle communications system in an embodiment of the present invention.

FIG. 3 is a process flow diagram illustrating a method for managing technical services within a mobile vehicle communications system in an embodiment of the present invention. In one embodiment, method 300 is implemented with components of the exemplary systems described with reference to FIGS. 1 and 2. In another embodiment, one or more steps of method 300 are embodied in a computer readable medium containing computer readable code such that the steps are implemented when the computer readable code is executed on a computing device. Method 300 begins in step 310. In step 310, a request for technical services is received from a telematics device. In one embodiment, the request for technical services is received at any time that a mobile vehicle 210 is operational. In another embodiment, the request for technical services is received subsequent to a user becoming aware of a pending technical services action at the service provider, such as for example via a notice generated to the user from the service provider. In yet another embodiment, the request for technical services includes vehicle identification data for the telematics device requesting the technical services. Vehicle identification data includes, but is not limited to, a VIN, a telematics device ESN, a telephone number a mobile identification number (MIN) and the like.

In step 320, a technical service action is determined based on the received request for technical services. In an embodiment, the determining occurs at any time after the request is received. In one embodiment, determining a technical service action includes identifying a user account associated with the telematics device based on the received request, and determining if one or more technical service actions associated with the user account are pending in a technical services queue. In one embodiment, the request for technical services includes vehicle identification data for the telematics device requesting the technical services that is provided through an authenticating phone number for a technical services pending job queue. A service center having a database of user account information and telematics identification data retrieves customer account data based on the vehicle identification that correlates a request for technical services with a specific technical service that is pending in a technical services job queue for one or more vehicles associated with the customer's account.

In step 330, a technical service is provided to the telematics device responsive to the technical service action determination. In an embodiment, the technical services are provided at any time after the technical service job has been determined. In another embodiment, the technical service is delayed until a later time and a timer or trigger is set to initiate the technical service. In yet another embodiment, the technical service comprises SID table updates, telematics device reconfigurations, mobile configurations, programming error corrections, and phone number configurations. As used herein, the term "trigger" comprises a broad definition but includes a condition detected to activate a function based on a logical, physical or temporal event.

One embodiment includes maintaining a technical services queue. The queue is maintained by selecting a technical service action for at least one telematics device, associating the technical service action with a user account and a vehicle identification for the user account, assigning the associated technical service action to a position in a technical services queuing database, and generating a notification of a pending technical service action for a user based on the technical service action associated with the user account. In one embodiment, a customer is notified via a mailing that a technical service is pending or required. In another embodiment, a customer is notified via a telephone call from a real or virtual advisor that a technical service is pending or required.

Another embodiment includes generating a technical services request from the telematics device. The technical service request is generated at the telematics device by activating a user interface, receiving a command to the user interface to initiate a technical service request, and initiating a technical services communication protocol sequence based on the received command. In one embodiment, the user interface is a voice recognition interface. In another embodiment, the user interface is a designated technical services button on a telematics device.

In one embodiment initiating the technical services communication protocol sequence includes initiating a first authenticating telephone call attempt from a telematics device to a technical services queue through a first carrier by outpulsing a first telephone number and determining if the first telephone number is registered in the home location register of the first carrier where the call attempt is aborted when the first telephone number is not registered in the home location register of the first carrier; initiating a second authenticating telephone call attempt through a secondary carrier by outpulsing the first telephone number when the first telephone number is not registered in the home location register of the first carrier and then determining if the first telephone number is registered in the home location register of the second carrier wherein the call is aborted when the first telephone number is not registered in the home location register of the second carrier. Vehicle identification data is subsequently exchanged between the telematics device and the technical services queue modem when an authenticating call is verified in the home location register of the first and second carrier responsive to each above determination. In one embodiment, an authenticating telephone number is a 1-(800) telephone number that directly connects to a technical services queue in a data mode.

Another embodiment further includes initiating a third telephone call attempt from the telematics device to a call center through the first carrier by outpulsing a second telephone number when the second authenticating call attempt fails and initiating a fourth telephone call attempt from the telematics device to the call center through the second carrier by outpulsing the second telephone number when the third telephone call attempt fails. The vehicle identification data is exchanged between the telematics device and the call center modem when a telephone call is connected. In another embodiment, the second telephone number is a "CLEARED" number that connects to a service provider in a data mode. Once a call using the second telephone number is connected a modem handshake exchanges vehicle identification data, which allows automated connection to a technical services queue.

Yet another embodiment includes initiating a fifth telephone call from the telematics device to the call center through the first carrier by outpulsing a failed-to-voice telephone number when the second authenticating call attempt fails wherein the failed-to-voice number connects with an advisor interface at a call center. An advisor is then required to assist the customer by directing the customer to a technical advisor, or manually entering data into an advisor interface to complete a technical service for the customer.

The method and systems described above enable a convenient and efficient solution to managing technical services within mobile vehicle communications system. A computer-enabled embodiment of the described method provides an automated process for directing inbound and outbound communications both to and from a service provider and a vehicle to accomplish specific technical services. A significant reduction in customer service delay time, human overhead and redundancy is accomplished while also providing simultaneous service to thousands of vehicles with similar or different technical services requests.

It is anticipated that the invention will be embodied in other specific forms not described that do not depart from its spirit or essential characteristics. The described embodiments are to be considered in all respects only as illustrative and not restrictive.

We claim:

1. A method for providing technical services to a telematics device, the method comprising:

selecting, at a service center configured to facilitate communications to and from the telematics device, a technical service action for at least one telematics device;
associating, at the service center, the selected technical service action with a unique identification code assigned to a respective telematics device;
storing the associated technical service action in a technical services database; then
receiving, at the service center, a request for technical services from the telematics device, the request for technical services including an associated unique identification code;
comparing the assigned unique identification code to the associated unique identification code; and
providing the technical service action from the service center to the respective telematics device if the assigned unique identification code matches the associated unique identification code.

2. The method of claim 1, further comprising generating the request for technical services at the telematics device.

3. The method of claim 2 wherein generating the request for technical services comprises:
activating a user interface;
receiving a command at the user interface to initiate the request for technical services; and
initiating a technical services communication protocol sequence based on the received command.

4. A computer readable medium storing a computer program for providing technical services to a telematics device, the medium comprising:
computer readable code for selecting, at a service center configured to facilitate communications to and from the telematics device, a technical service action for at least one telematics device;
computer readable code for associating, at the service center, the selected technical service action with a unique identification code assigned to a respective telematics device;
storing the associated technical service action in a technical services database; computer readable code for receiving, at the service center, a request for technical services from the telematics device, the request for technical services including an associated unique identification code;
computer readable code for comparing the assigned unique identification code to the associated unique identification code; and
computer readable code for providing the technical service action from the service center to the respective telematics device if the assigned unique identification code matches the associated unique identification code.

5. The computer readable medium of claim 4, further comprising computer readable code for generating the request for technical services at the telematics device.

6. The computer readable medium of claim 5 wherein the computer readable code for generating the request for technical services comprises:
computer readable code for activating a user interface;
computer readable code for receiving a command at the user interface to initiate the request for technical services; and
computer readable code for initiating a technical services communication protocol sequence based on the received command.

7. The method of claim 1, further comprising notifying a user of the stored associated technical service action.

8. The method of claim 7 wherein prior to notifying the user, the method further includes generating a notification of the stored associated technical service action.

9. The method as defined in claim 1 wherein each of the assigned unique identification code and the associated unique identification code is selected from a vehicle identification number, a vehicle system electronic serial number, a telematics unit electronic serial number, and combinations thereof.

10. The method as defined in claim 1 wherein the technical services are selected from system identifier (SID) table updates, telematics device reconfigurations, mobile configurations, programming error corrections, phone number configurations, and combinations thereof.

11. The computer readable medium of claim 4, further comprising computer readable code for generating a notification of the stored associated technical service action.

12. The computer readable medium of claim 11, further comprising computer readable code for notifying a user of the stored associated technical service action.

13. The computer readable medium of claim 4 wherein each of the assigned unique identification code and the associated unique identification code is selected from a vehicle identification number, a vehicle system electronic serial number, a telematics unit electronic serial number, and combinations thereof.

14. The computer readable medium of claim 4 wherein the technical services are selected from SID table updates, telematics device reconfigurations, mobile configurations, programming error corrections, phone number configurations, and combinations thereof.

* * * * *